SERIAL BINARY MULTIPLIER ARRANGEMENT

Filed April 4, 1966 2 Sheets-Sheet 1

INVENTORS E. GOMEZ
R. KLAHN
BY Stephen B. Judlowe
ATTORNEY

FIG. 2

| TIME | MULTIPLICAND DIGIT SOURCE 10 | SHIFT REGISTER 20 STAGE $21_1$ | $21_2$ | $21_3$ | OUTPUT OF THE ADDER-SUBTRACTOR CCT. 60 |
|---|---|---|---|---|---|
| a | – | 0 | 0 | 0 | – |
| b | 0 | 0 | 0 | 0 | 0 |
| c | 1 | 0 | 0 | 0 | 1 |
| d | 1 | 1 | 0 | 0 | 1 |
| e | 0 | 1 | 1 | 0 | 1 |
| f | 0 | 0 | 1 | 1 | 1 |
| g | 0 | 0 | 0 | 1 | 0 |
| h | 0 | 0 | 0 | 0 | – |

United States Patent Office 3,456,098

Patented July 15, 1969

3,456,098

SERIAL BINARY MULTIPLIER ARRANGEMENT

Ernest Gomez, Dover, and Richard Klahn, Mendham Township, Morris County, N.J., assignors to Bell Telephone Laboratories, Incorporated, New York, N.Y., a corporation of New York Filed Apr. 4, 1966, Ser. No. 539,892
Int. Cl. G06f 7/39
U.S. Cl. 235—164 11 Claims

ABSTRACT OF THE DISCLOSURE

A serial binary multiplier arrangement for multiplying an arbitrarily long multiplicand by a three-digit multiplier includes a three-stage shift register. Each stage of the register, through which the multiplicand digits are shifted, provides a replica of the multiplicand, each replica being characterized by a different time delay. Boolean logic networks, responsive to the parallel source of multiplier digits, gate one or a pair of the time delayed multiplicand replicas to an adder-subtractor unit. A mode logic network, also responsive to the information in the multiplier register, enables the adder-subtractor unit to perform either addition or subtraction of the multiplicand replicas.

Figure 1:
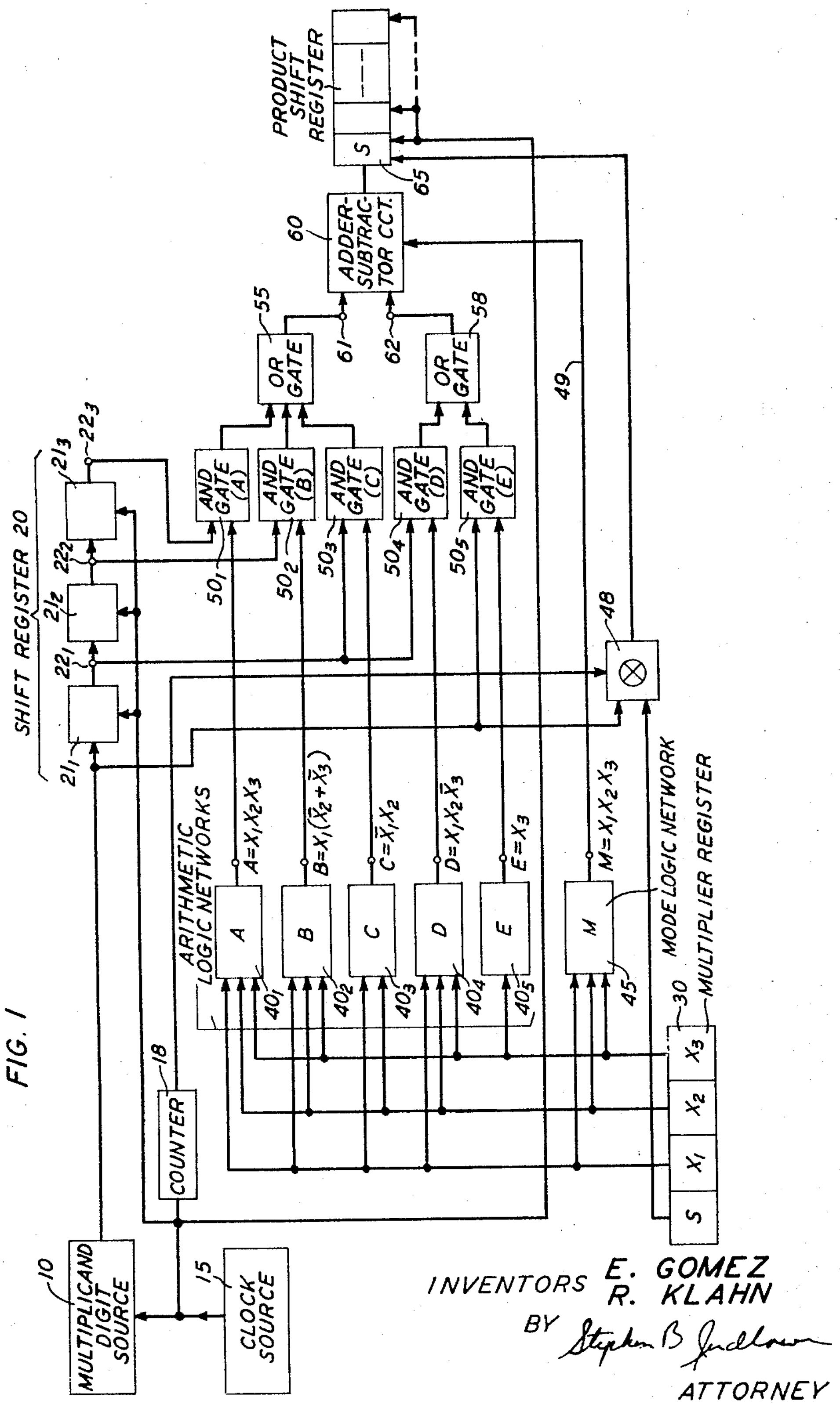

This invention relates to data processing circuits and, more specifically, to an arrangement for serially multiplying two binary quantities.

Binary multiplication is one of the more complex and time consuming arithmetic operations performed by digital computing machines. In general, this operation is effected in the binary domain by left shifting a multiplicand quantity a number of places generally specified by each binary weighted "1" appearing in a multiplier digital word, and adding the shifted quantity to a running partial sum. Thus, for example, prior art circuits function to multiply a multiplicand 110 (decimal 6) by a multiplier 101 (decimal 5) as follows:

| | |
|---|---|
| Initial partial product | 0 0 0 |
| Multiplicand left shifted 0 spaces for the binary "1" in the $2^0$ multiplier column | +1 1 0 |
| Recomputed partial product | 1 1 0 |
| Multiplicand left shifted 2 spaces for the binary "1" in the $2^2$ multiplier column | +1 1 0 0 0 |
| Final product | 1 1 1 1 0 |

to yield 11110 (decimal 30).

However, it is observed from the above multiplication that for an $m$ bit multiplier comprising all binary "1's," $m$ additions are required to finally determine the requisite product. Moreover, assuming the presence of an $n$ bit multiplicand, each such addition takes at least $n$ operational time intervals to account for all carry propagations. Hence, the composite multiplication may consume a considerable computing period, i.e., more than $n \times m$ computational periods.

It is therefore an object of the present invention to provide an improved binary multiplier organization.

More specifically, an object of the present invention is the provision of a multplier structure which operates in a relatively fast, serial mode.

Another object of the present invention is the provision of a binary multiplication arrangement which may be relatively simple and inexpensively constructed, and which is highly reliable.

These and other objects of the present invention are realized in a specific illustrative digital multiplier organization operable in a relatively fast, serial mode. The arrangement includes a shift register which has a binary multiplicand word sequentially propagated therethrough.

A plurality of Boolean logic gates are responsive to the multiplier digits for translating signals derived from a selected pair of register stages to two inputs of a binary adder-subtractor circuit. The output digit stream generated by the adder-subtractor comprises a serial representation of the product of the multiplicand and multiplier variables.

It is thus a feature of the present invention that a binary multiplier organization include circuitry for serially propagating multiplicand digits through a plurality of shift register stages, a binary adder-subtractor having first and second input terminals, logic circuitry for selectively connecting one of the shift register stages to the first adder-subtractor input terminal and for connecting a different one of the register stages to the second adder-subtractor input terminal, and a parallel source of multiplier digits for controlling the logic circuitry.

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 comprises a schematic diagram of a digital multiplying arrangement which embodies the principles of the present invention; and FIG. 2 is a timing chart depicting the digital status characterizing selected circuit elements shown in FIG. 1.

Referring now to FIG. 1, there is shown an illustrative binary multiplier organization operable for a four digit multiplier (one sign digit and three magnitude digits) and a multiplicand of an arbitrary length. The multiplicand digits are serially supplied by a source 10 to a shift register 20 responsive to pulses supplied thereto by a clock source 15. The shift register 20 includes three shifting stages $21_1$ through $21_3$ each having an output terminal 22 therein.

The output digits generated by the multiplicand source 10 are directly supplied to one input of an AND gate $50_5$. Similarly, the digits present at the shift register output terminals $22_1$, $22_2$, and $22_3$ are respectively supplied to an input terminal on AND gate(s) $50_3$ and $50_4$, $50_2$ and $50_1$.

Two OR gates 55 and 58 respectively connect the outputs of the AND gates $50_1$, $50_2$ and $50_3$, and $50_4$ and $50_5$ to two input terminals 61 and 62 of an adder-subtractor circuit 60. The element 60 is adapted to quiescently add the digits supplied to the two input terminals 61 and 62 thereon, but to subtract the digit present at the terminal 62 from the quantity at the terminal 61 when a lead 49 is energized by a mode logic network 45. The signals generated by the adder-subtractor 60, which serially comprise the desired multiplication product, least significant digit first, are registered in and propagated through a product shift register 65 responsive to successive clock pulses supplied thereto by the clock source 15.

The AND gates $50_1$ through $50_5$ are selectively enabled to pass the associated shift register 20 output signals to the adder-subtractor 60 by a corresponding plurality of arithmetic logic networks $40_1$ through $40_5$. A four-stage parallel multiplier register 30 is included in the FIG. 1 arrangement to store four digits identifying the multiplier quantity including a sign S digit and three magnitude X digits which decrease in significance from $X_1$ through $X_3$. The multiplier digit variables $X_1$ through $X_3$ are selectively supplied to the arithmetic logic networks $40_1$ through $40_5$ and 45 in a pattern shown in the drawing, with these networks being respectively adapted to generate a plurality of Boolean functions A through E and M shown therein, and also considered further hereinafter. It is observed that all logic networks and gates employed in the FIG. 1 organization may illustratively embody the structures shown in chapter 4 of a text by S. H. Caldwell, entitled Switching Circuits and Logical Design, copyrighted in 1958 by John Wiley & Sons, Inc.

A counter 18 is utilized to enable an Exclusive OR logic gate 48 when the multiplicand source 10 responds to a selected clock pulse by outputting the final, or sign bit of a particular multiplicand as an input to the gate 48. In addition, the sign S digit contained in the multiplier register 30 is translated as an input variable to the gate 48. If one and only one of the multiplier and multiplicand sign bits are manifested by a relatively high, binary "1" potential (indicative of a negative sign), the gate 48 is operative to store a negative indicating binary "1" in the left most, or sign storage stage of the product shift register 65.

By way of an underlying algorithm, it is recalled from the discussion hereinabove that binary multiplication can be effected by shift(s) and summation(s). In particular, a left shift of 3, 2, 1, or 0 places for a binary multiplicand, with the right voids being filled by zeros, corresponds to a multiplication of the multiplicand by the decimal numbers, 8, 4, 2, or 1. To extend this proposition, we have discovered that a multiplication by other multipliers, for example by decimal 5, may be effected by algebraically combining two time shifted multiplicand replicas, i.e., in the case of a multiplier of 5 by left-shifting the multiplicand two places (×4) and adding thereto a nonshifted (×1) representation of the multiplicand. Similarly, a multiplication by decimal 7 may be effected by subtracting a nonshifted multiplicand (×1) from a three-place left shifted multiplicand (×8).

The complete list of operations to effect multiplication by three digit multipliers from 0 through 7 (decimal) is shown in Table I below, wherein ×8 (times 8) ×4, ×2, and ×1 represent a left-shifting of 3, 2, 1 and 0 places for the multiplicand.

TABLE I

| Decimal multiplier | Binary multiplier | | | Function associated with the terminals | | | Boolean logic operations | |
|---|---|---|---|---|---|---|---|---|
| | $X_1$ | $X_2$ | $X_3$ | 61 | | 62 | | |
| 0 | 0 | 0 | 0 | | | | | |
| 1 | 0 | 0 | 1 | | | ×1 | | E |
| 2 | 0 | 1 | 0 | ×2 | | | C | |
| 3 | 0 | 1 | 1 | ×2 | + | ×1 | C | E |
| 4 | 1 | 0 | 0 | ×4 | | | B | |
| 5 | 1 | 0 | 1 | ×4 | + | ×1 | B | E |
| 6 | 1 | 1 | 0 | ×4 | + | ×2 | B | D |
| 7 | 1 | 1 | 1 | ×8 | − | ×1 | A | E |

The Boolean variables A, B, C, D and E are employed in the drawing and illustrated in Table I as respectively representing a multiplication by 8 (×8) in the terminal 61 column of the table, ×4 in the terminal 61 column, ×2 in the terminal 61 column, ×2 in the terminal 62 column, and ×1 in the terminal 62 column.

By employing standard Boolean combination techniques, it may be determined that, for example, the B function arithmetic logic network $40_2$ in FIG. 1 must generate an output satisfying the Boolean minterm expression $$B=X_1\overline{X}_2\overline{X}_3+X_1\overline{X}_2X_3+X_1X_2\overline{X}_3 \quad (1)$$

which reduces to $$B=X_1(\overline{X}_2+\overline{X}_3) \quad (2)$$

The expressions of the Boolean variables A through E are given below in Table II:

TABLE II

| Variable: | Expression |
|---|---|
| A | $X_1X_2X_3$ |
| B | $X_1(\overline{X}_2+\overline{X}_3)$ |
| C | $\overline{X}_1X_2$ |
| D | $X_1X_2\overline{X}_3$ |
| E | $X_3$ |

In addition, it is observed from Table I supra that a subtraction operation is required only for a multiplication by decimal 8, i.e., when $X_1=X_2=X_3=1$. Hence, the mode logic gate 45 comprises a three variable AND gate and is adapted to energize the lead 49 and render the element 60 operative in a subtraction mode subject to the Boolean expression $M=X_1X_2X_3$.

To further illustrate the operation of the FIG. 1 multiplier organization, let the multiplicand digit source 10 serially supply six magnitude bits 000110 in a right to left order followed by a "1" sign bit (−6 decimal). Further, assume that all shift register 20 stages 21 initially reside in a binary "0" state, and that the multiplier register 30 contains the multiplier digits 0 (sign) 101 (amplitude) corresponding to +5 decimal. These above specified initial binary conditions for the shift register 20 are shown for a time *a* in FIG. 2.

In accordance with the multiplier digits $X_1=1$, $X_2=0$, and $X_3=1$, the expressions $$B=X_1(\overline{X}_2+\overline{X}_3)=1(1+0)=1 \quad (3)$$

and $$E=X_3 \quad (4)$$

while $$A=X_1X_2X_3=1\cdot0\cdot1=0 \quad (5)$$

$$C=\overline{X}_1X_2=0\cdot0=0 \quad (6)$$

$$D=X_1X_2\overline{X}_3=1\cdot0\cdot0=0 \quad (7)$$

and $$M\text{ (mode)}=X_1X_2X_3=1\cdot0\cdot1=0 \quad (8)$$

Hence, for a multiplier of 5, only the B and E functions are satisfied, and therefore only the logic networks $40_2$ and $40_5$ are activated to partially enable the corresponding AND gates $50_2$ and $50_5$. Also, the adder-subtractor circuit 60 functions in an addition mode since the mode network 45 does not energize the lead 49 (Equation 8).

When the multiplicand digit source 10 supplies the first multiplicand digit, viz., a binary "0" at a time *b* shown in FIG. 2, responsive to a clock source 15 output pulse, the gate $50_5$ translates the "0" signal to the input terminal 62 of the adder-subtractor circuit 60 by way of the OR gate 58. Coincidently therewith, the partially enabled AND gate $50_2$ passes the binary "0" present at the shift register output terminal $22_2$ to the adder-subtractor input terminal 61 via the OR gate 55. The element 60 responds to the two "0" input signals supplied thereto by registering a sum of "0" for the least significant product digit in the input stage of the product shift register 65, as also shown in FIG. 2 for the time *b*.

At a time *c* shown in FIG. 2, the source 10 responds to the next following clock energization by supplying the second multiplicand digit, viz., a binary "1," to the shift register stage $21_1$, and also to the adder-subtractor 60 input terminal 62 via the AND gate $50_5$ and the OR gate 58. Coincidently therewith, the "0" at the shift register output terminal $22_2$ is translated to the adder-subtractor input terminal 61 through the gates $50_2$ and 55. Hence, the adder-subtractor 60 generates a "1" sum output, shown for the time *c* in FIG. 2, and registers this digit in the product shift register 65, with the initial product "0" digit being shifted one place to the right. Similar system functioning occurs at a time *d* shown in FIG. 2 responsive to the third multiplicand digit which is a binary "1," with the adder-subtractor 60 registering a second consecutive output binary "1" in the product shift register 65.

At a time *e*, the fourth multiplicand digit, a "0," is supplied to the adder-subtractor 60 input terminal 62 by the gates $50_5$ and 58. However, the initial multiplicand "1" digit initially supplied to the shift register 20 at the time *c* resides in the second shifting stage $21_2$ at the time *e*. Hence, the relatively high potential appearing at the second stage output terminal $22_2$ communicates a binary "1" digit to the adder-subtractor input terminal 61 via the fully enabled AND gate $50_2$ and the OR gate 55 at the time *e*. Accordingly, the element 60 registers another binary "1" in the product shift register 65 at this time. Corresponding circuit functioning, as graphically illustrated in the table of FIG. 2, reoccurs until the output quantity 0 1 1 1 1 0 (decimal 30) resides in the product register 65, hence yielding the proper product of the multiplier magnitude |5| and the multiplicand magnitude |6|.

At a time *h* the multiplicand sign digit "1" is supplied by the multiplicand source 10 to the Exclusive OR gate 48, with the gate 48 being enabled at this time by the counter 18 which has interpreted the seventh received clock 15 output pulse as occurring in time coincidence with the multiplicand sign bit. Since the sign S digit of the multiplier is a "0" while the multiplicand sign digit is a "1," the Exclusive OR gate 48 is adapted to insert a negative sign indicating binary "1" into the first, or sign storage stage of the product shift register 65. Hence, the contents of the shift register 65, viz., 101110 (−30 decimal), correctly comprises the product of the multiplicand (−6) and the multiplier (+5).

Moreover, the FIG. 1 organization is operable by way of a corresponding sequence of circuit functioning to form the product of any other two multiplier and multiplicand quantities.

It is to be understood that the above-described arrangement is only illustrative of the application of the principles of the present invention. Numerous other configurations may be devised by those skilled in the art without departing from the spirit and scope thereof. For example, the mode logic network 45 may be deleted since it embodies the same logic function as the arithmetic logic network $40_1$. Hence, the output of the element $40_1$ may be employed to select a mode for the adder-subtractor circuit 60. In addition, the adder-subtractor 60 may be replaced by a simple adder configuration, with additional logic circuitry being employed to selectively effect subtraction by complement arithmetic operating on the signals appearing at the output of the OR gate 58 and also operating on the resulting adder output signals.

What is claimed is:

1. In combination in a digital multiplier organization, a plural stage shift register having input, first intermediate, second intermediate, output and shift terminals, a source of multiplicand digits connected to said shift register input terminal, means connected to said plural stage shift register shift terminals for propagating said multiplicand digits supplied from said source of multiplicand digits through said shift register stages, adder-subtractor means having first and second input terminals, said adder-subtractor means being characterized by and addition mode and a subtraction mode, and logic circuit means connected between said multiplicand shift register and said adder-subtractor means for selectively connecting only a single one of said multiplicand shift register input and first intermediate terminals to said first adder-subtractor input terminal and for selectively connecting only a single one of said multiplicand shift register first intermediate, second intermediate and output terminals to said second adder-subtractor input terminal.

2. A combination as in claim 1 further comprising a parallel source of multiplier digits and means connecting said source of multiplier digits to said logic circuit means for controlling said logic circuit means.

3. A combination as in claim 2 further comprising means connected between said parallel source of multiplier digits and said adder-subtractor means responsive to the digital information included in said parallel source of multiplier digits for selecting between said subtraction mode and said addition mode of said adder-subtractor means.

4. A combination as in claim 3 further comprising a product register connected to said adder-subtractor means.

5. A combination as in claim 4 wherein said logic circuit means comprises a plurality of AND gates each connected to one of said multiplicand shift register input, first intermediate, second intermediate or output terminals and wherein said logic circuit means further comprises two OR gates connecting different subsets of said AND gates to a different one of said two adder-subtractor input terminals.

6. A combination as in claim 5 wherein said means for controlling said logic circuit means further comprises a plurality of logic networks each responsive to at least one of the digits included in said parallel source of multiplier digits for selectively partially enabling a different one of said AND gates.

7. In combination in a binary multiplier organization, means for serially supplying multiplicand digits, means connected to said means for supplying multiplicand digits for generating plural delayed replicas of said multiplicand digits, each of said replicas being characterized by a different time delay, adder-subtractor means, and logic means connected between said delayed replica generating means and said adder-subtractor means for translating selected ones of said delayed multiplicand digit replicas to said adder-subtractor means.

8. A combination as in claim 7 further comprises a parallel source of multiplier digits and control connecting means connecting said parallel source of multiplier digits to said logic means, said control connecting means being arranged to convey control information from said parallel source of multiplier digits to said logic means.

9. A combination as in claim 8 further comprising an output register connected to said adder-subtractor means.

10. A combination as in claim 9 wherein said delayed replica generating means comprises a plurality of cascaded shift register stages.

11. A combination as in claim 7 wherein said logic means comprises: a plurality of AND gates each connected to said delayed replica generating means for receiving a replica of said serial multiplicand digits characterized by a different time delay, OR logic means connecting said AND gates to said adder-subtractor means, and a plurality of logic networks connected to said parallel source of multiplier digits control connecting means and responsive to the binary information included in said parallel source of multiplier digits for enabling a selected subset of said AND gates.

References Cited

UNITED STATES PATENTS

| | | | |
|---|---|---|---|
| 3,302,008 | 1/1967 | Mitchell | 235—164 |
| 3,123,707 | 3/1964 | Kilburn et al. | 235—164 |
| 3,159,739 | 12/1964 | Deerfield | 235—164 |

MALCOLM A. MORRISON, Primary Examiner
DAVID H. MALZAHN, Assistant Examiner

U.S. Cl. X.R.

235—159, 160